United States Patent [19]

Gross et al.

[11] Patent Number: 4,974,942

[45] Date of Patent: Dec. 4, 1990

[54] ACTIVE FLAT-DESIGN VIDEO SCREEN

[75] Inventors: Daniel Gross, Carouge, Switzerland; Gert Hewig, Alzenau; Ralf Dornhaus, Hammersbach, both of Fed. Rep. of Germany; Alan L. Harmer, Plan-les-Ouates, Switzerland

[73] Assignees: Battelle Memorial Institute, Carouge/Genf, Switzerland; Battelle Institute e.V., Frankfurt, Fed. Rep. of Germany

[21] Appl. No.: 156,140

[22] Filed: Feb. 16, 1988

[30] Foreign Application Priority Data

Feb. 13, 1987 [EP] European Pat. Off. ........ 87102028.5

[51] Int. Cl.$^5$ ............................ G02F 1/13; G02B 6/10
[52] U.S. Cl. .............................. 350/347 V; 350/96.14; 350/96.29; 350/355; 350/269
[58] Field of Search ............. 350/347 V, 96.13, 96.14, 350/96.29, 353, 355, 269; 358/59, 241, 336, 236

[56] References Cited

U.S. PATENT DOCUMENTS

| 4,128,299 | 12/1978 | Maher | 350/96.13 |
| 4,278,327 | 7/1981 | McMahon et al. | 350/96.14 |
| 4,545,078 | 10/1985 | Wiedeburg | 350/96.13 |
| 4,737,014 | 4/1988 | Green | 350/347 V |
| 4,762,383 | 8/1988 | Yamashita et al. | 350/96.13 |

Primary Examiner—Andrew J. James
Assistant Examiner—Napoleon Thantu
Attorney, Agent, or Firm—Cushman, Darby & Cushman

[57] ABSTRACT

An active flat-design video screen is described, having signal line means arranged in lines and columns, these signal line means, at their crossing points, defining picture elements of the video screen, in which case the lines that are arranged in columns are developed as electrodes and the signal line means that are arranged in lines are developed by means of optical waveguides into which, on the input side, a modulated light signal is coupled and which, at each crossing point, have a device for the coupling-out of the respective light signal. In comparison to conventional active flat-design video screens, the video screen according to the invention distinguishes itself particularly by a good picture resolution and a good contrast range, connected with a good regeneration rate.

20 Claims, 9 Drawing Sheets

ACTIVE FLAT-DESIGN VIDEO SCREEN

The invention relates to an active flat-design video screen having signal line means which are arranged in two groups, specifically in lines and in columns, and which, at their crossing points, define picture elements of the video screen, and having a control and signal processing operation for the picture information supplied to the signal line means, as well as having at least one light element which, at each crossing point, emits a correspondingly modulated light.

Active video screens of this type are known in which the picture elements are generated by liquid crystals. In this case, both groups of signal line means are formed by electric lines, the liquid crystal in each case being located at their crossing points. For their functioning, the known video screens require an active electronic switching device (a diode or a transistor) at each crossing point. Their manufacturing is therefore relatively difficult. In addition, these known video screens have a limited regeneration rate, a limited resolution and a very limited contrast range that is badly suited for a realistic display of television pictures or for a fatigue-proof representation of data on monitors.

Another known model of these types of active video screens uses miniaturized electron-beam tubes, the electron beam being deflected by approximately 90° and impacting on a fluorescent layer arranged next to the electron gun. These active video screens are, however, unsuitable for many purposes, because they have a relatively large constructional depth.

The invention avoids these disadvantages. It is based on the objective of proposing an active video screen that can be manufactured in a flat-type design and distinguishes itself particularly by a good regeneration rate, a good resolution and a good contrast range so that the video screen according to the invention, on the whole, is suitable for a realistic display of television pictures and other data. Preferably, it should be possible to construct the video screen according to the invention in a small size so that it can be viewed from a short distance by the naked eye, by means of a magnifying glass or also by means of an eyepiece.

In order to achieve this objective, the invention is characterized in that one of the two groups of signal line means is formed by optical waveguides into which the modulated light signal is coupled on the input side and which, at each of the crossing points, have a device, that can be acted upon by the control, for the coupling-out of the optical signal that is present in this optical waveguide, in a direction that extends essentially perpendicularly with respect to the plane of the video screen.

By means of the optical waveguides used according to the invention, a good visual quality is therefore obtained of the picture that is emitted by the video screen. On the input side, the correspondingly modulated signal is coupled into the optical waveguides, and, at the crossing points, the signal is coupled out and therefore results in the respective picture element, or in the picture, when all picture elements are considered together. By means of the second group of signal line means, generally electrical signal lines (strip electrodes), and the assigned control, the picture of the video screen is created sequentially; i.e., the picture elements of the video screen are excited in parallel to one another or successively in each line, and successively line after line, in such a short sequence that the picture is created for the viewer.

Preferred embodiments of the invention are indicated in the subclaims.

In the following, the invention is explained in detail by means of embodiments that exhibit other important characteristics.

FIG. 6a is a perspective view of an electro-optical modulator array;

FIG. 6b is a front view of FIG. 6a;

By means of the present invention, a preferably small-size active video screen is to be created in a flat design, the operation of which is possible, without any disadvantageous effect on the luminous efficacy and on the contrast, with low electric power, and by means of which portable, miniature-type video displays can be implemented.

Figure 1:
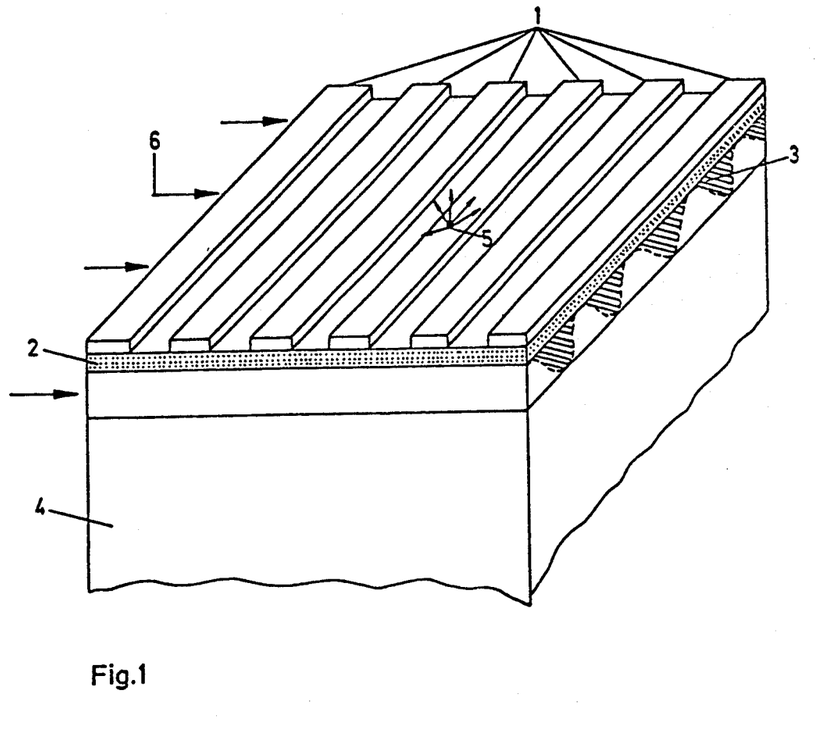
FIG. 1 is a schematic and perspective view of a representation for explaining the basic principle of the invention.

For this purpose, FIG. 1, as the basic schematic representation, shows a first group of strip electrodes 1 arranged in columns. At the underside of the strip electrodes, a layer is located that serves as the device 2 for the coupling-out of light. Below it, in turn, a second group of optical waveguides 3 is located that are arranged in lines. The arrangement is mounted on a carrier 4.

The crossing points 5 between the strip electrodes 1 and the optical waveguides 3 represent the picture elements of the active video screen. For this purpose, it is shown at Position 5 in FIG. 1 how the light is beamed into the upper half-space. The arrows on the left in FIG. 1 symbolize the light signals that have already been modulated corresponding to the picture information light/dark. The integrated-optical waveguide structure with the optical waveguides 3 causes the two-dimensional spatial distribution of the light signals. A controlling of the crossing electrodes 1 permits the coupling-out of the light signals at the respective picture elements or crossing points 5.

Figures 2, 3:
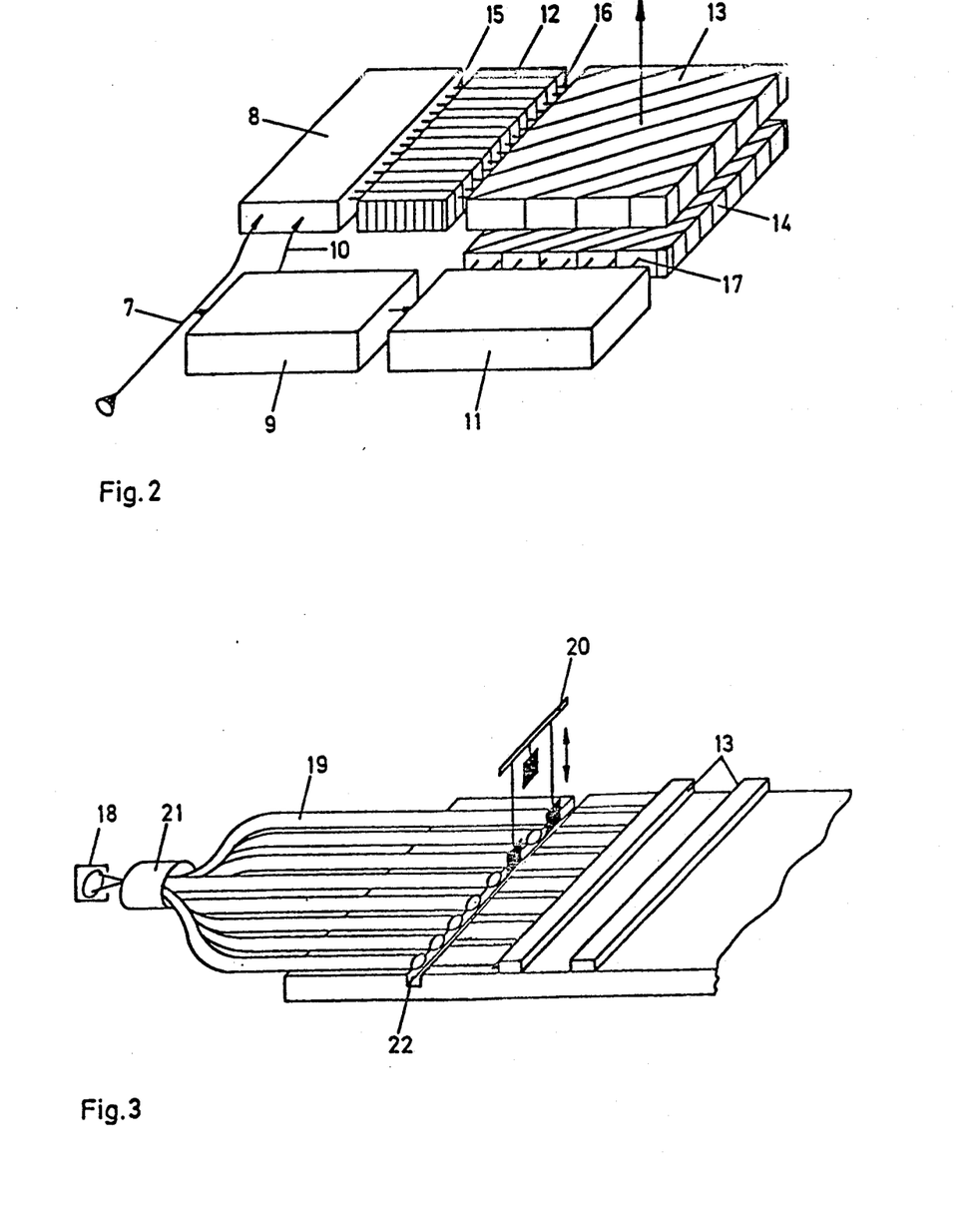
FIG. 2 is an also schematic and perspective view of the individual componentries that make up the video screen according to the invention.
FIG. 3 is a schematic and perspective view of an embodiment of the device for the generating and modulating of light in the waveguides.

FIGS. 2 shows the essential componentries of an active video screen, basically using the arrangement outlined in FIG. 1. It shows that a video input signal, via a line 7, is fed into an electronic video signal processing system 8. In addition, the video input signal at the same time reaches an electronic time-synchronizing and control system 9 that, via an additional line 10, is also connected to electronic system 8. In addition, the output signals of electronic system 9 reach an electronic control system 11 for the strip electrodes.

An electro-optical video signal generating system 12 is connected to the outputs of the electronic system 8 and an integrated-optical structure 13 is, in turn, connected to the outputs of this electro-optical video signal generating system 12, for distributing the picture information. This structure 13, in turn, is connected with a picture element coupling-out structure 14 that is controlled by the outputs of the electronic system 11.

Via line 10, synchonization signals are fed into the electronic system 8, and via lines 15, parallel electric video signals that are present at the output of electronic system 8 are fed into the input of the electro-optical system 12. At the output of this electro-optical system 12, in turn, via line 16, parallel optical video signals are fed into structure 13. Lines 17 finally indicate the sequentially electric control of structure 14.

The hatched componentries 12, 13, 14 form the actual core of the video screen according to the invention, while the other components 8, 9, 11 are known per se. Structures 13, 14 correspond essentially to the arrangement explained by means of FIG. 1.

The arrangement according to FIG. 2 basically operates as follows.

The electronic video signal processing system 8 receives, for example, a standardized television video signal which is serially transmitted line by line. This type of a signal $2 \times 25$ times per second contains a television picture that is coded by line-jump scanning. The electronic system 8 stores a first complete serial picture and transmits this picture after a series-parallel conversion during that time interval to the electro-optical componentry 12 during which the second picture is read into the memory.

If it is assumed that a picture has N lines, the analog-electrically coded video information of each line is stored in the electronic componentry 8 and, prolonged in time by the factor N, is fed into electro-optical componentry 12 simultaneously on each of the N video signal lines, i.e., in parallel. According to the embodiment of the componentry 12 according to the invention, the fed parallel and prolonged line video signals, in this case, with respect to the voltage and the impedance, must be matched to the corresponding electro-optical signal converters.

The video signal generating electro-optical componentry 12 may be implemented in different embodiments.

In a first embodiment, the N video signal lines drive a linear arrangement of N electroluminescent semiconductor diodes which, in turn, feed their line image signals into the N optical glass fibers or integrated-optical waveguides. In FIG. 2, these N light guides are symbolically represented as connections between componentries 12 and 13. In this first embodiment, the N light-emitting diodes or semiconductor lasers are built up, preferably together, on a substrate using integrated or hybrid technology. This building method makes it possible to obtain the high adjusting precision that is necessary for the coupling into the N light guides.

Using currently conventional high-efficiency light-emitting diodes, with a current of approximately 20 milliamps, output signals of approximately 120 mcd can be reached. If it is assumed that, on the average, half of the picture elements of a column, thus half of all diodes that in each case correspond to one line, are light, and all subsequent losses are taken into account by means of a factor of 100, a value of 144 cd/m$^2$, as an example, is obtained for a $5 \times 5$ cm$^2$ display with 600 lines. This value, as a medium brightness, is sufficient for a display.

The number of required light-emitting diodes may possibly be reduced by using integrated optical directional couplers for the sequential control of several lines by means of one light-emitting diode.

In a second embodiment of the electro-optical componentry 12, the light-generating and light-modulating functions are separate.

The generating of light, in this case, is implemented preferably by means of a special (low-voltage) bulb 18 containing a straight-line spiral-wound filament (compare FIG. 3) which, for example, is a ZrO, arc lamp or a miniature filament lamp. The luminous beam originating from the filament, via an optical condenser or via a light guide 21 having a large core diameter as well as via an optical fiber bundle 19 is imaged on the N input aperture diaphragms, that are arranged in a straight line, of a row of N electro-optical modulators 20.

The N modulators 20 are controlled in parallel by the N electric video signal lines. The optical video signals that with respect to time are controlled by the N modulators are fed into the N inputs of componentry 13 either by means of an objective or preferably via light guides.

The N electro-optical modulators that are arranged in a row, in turn, may be implemented in different embodiments.

In a first embodiment, each modulator 20 consists of an input polarizer, an electro-optical Kerr cell and an output polarizer. The polarizers, in this case, are arranged in such a way that the modulator cell, in the dead state, blocks the incident light and, when a video line signal is fed, transmits a light intensity that is correspondingly modulated with respect to time. The N Kerr cells may preferably be constructed as hybrid integrated electro-optical ceramic parts of the PLZT-type or as electro-optically active polymer lamina that are mounted on a substrate plate.

Figure 4A:
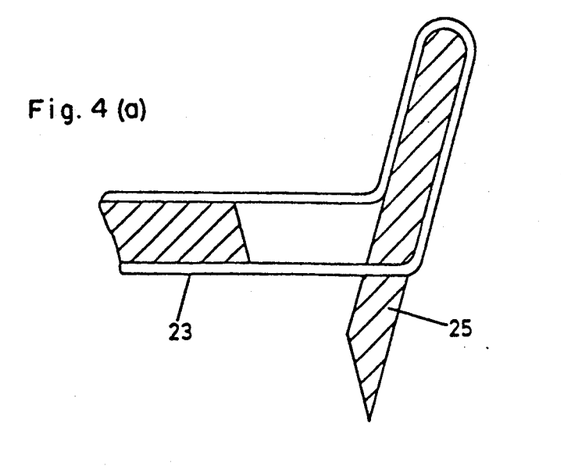
FIGS. 4a to 4c are views of an optical blade modulator used for this purpose.
Figures 4B, 4C:
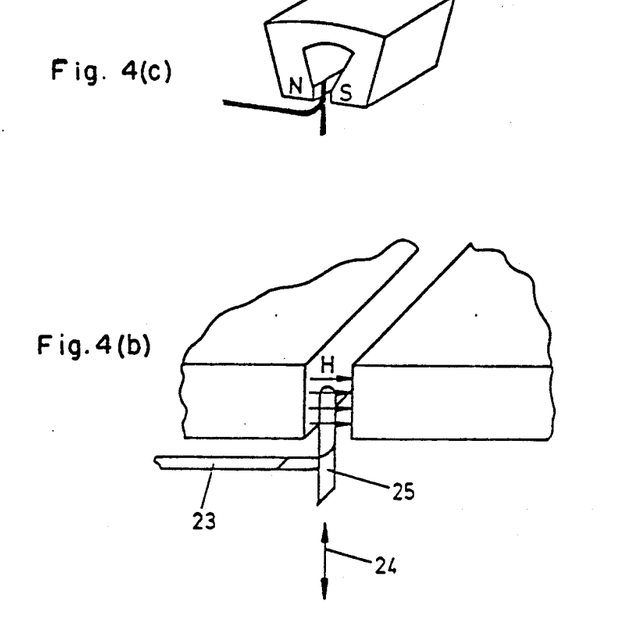

In a second embodiment (FIG. 4), each of the N modulators 20 is constructed as a piezoelectrically, electrodynamically, electromagnetically or electrostatically adjustable diaphragm blade 25. This diaphragm blade 25 dips more or less deeply into a separating gap 22 of, in each case, one waveguide 23 or of an optical fiber and thus reduces the light current proportionally to its position (see Arrows 24 in FIG. 4b).

FIG. 4a also shows a bladeholder 23 and FIG. 4c explains the pole arrangement provided in this case (N=north pole; S=south pole).

Figure 5:
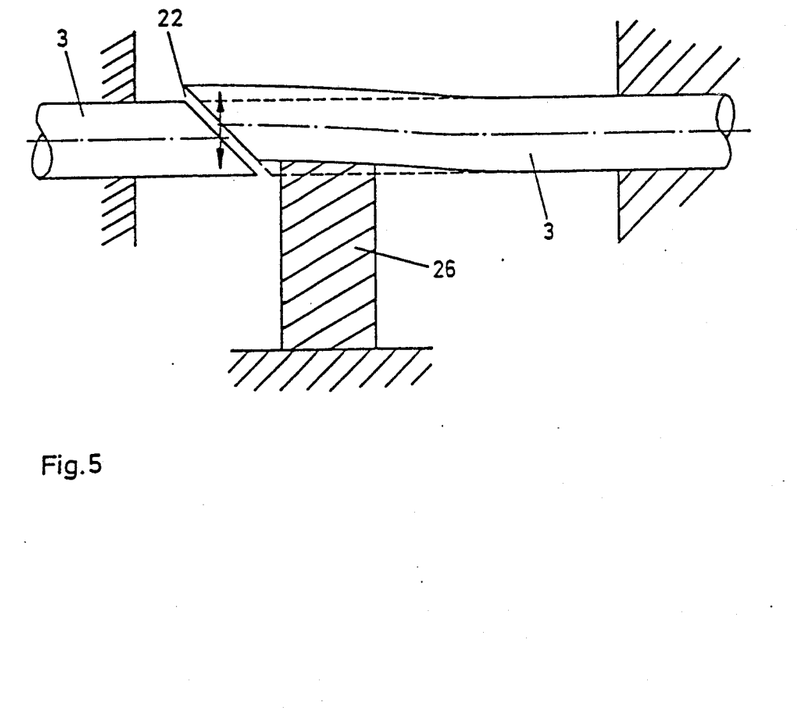
FIG. 5 is a view of the principle of an optomechanical total reflection modulator.

In a third embodiment, each of the N modulators 20 is constructed as an optomechanical total-reflection modulator (FIG. 5). In this case, each modulator consists of a fiber optical waveguide or of the integrated optical waveguide 3 in which a separating gap 22 is located that is arranged obliquely with respect to the beam direction, the gap width of this separating gap 22 being able to be modulated by means of a piezoelectric adjusting element 26 between zero and a maximal distance of a magnitude of one or several optical wave lengths. When the gap width is reduced to zero, the light that is fed into the waveguide will propagate practically without any reflection via the gap site and reach the corresponding optical waveguide 3 of componentry 13. When the gap 22 is opened, a light fraction that initially is proportional to the gap width is reflected away out of the gap in such a way that correspondingly less light falls into the optical waveguide of componentry 13.

Figure 6:
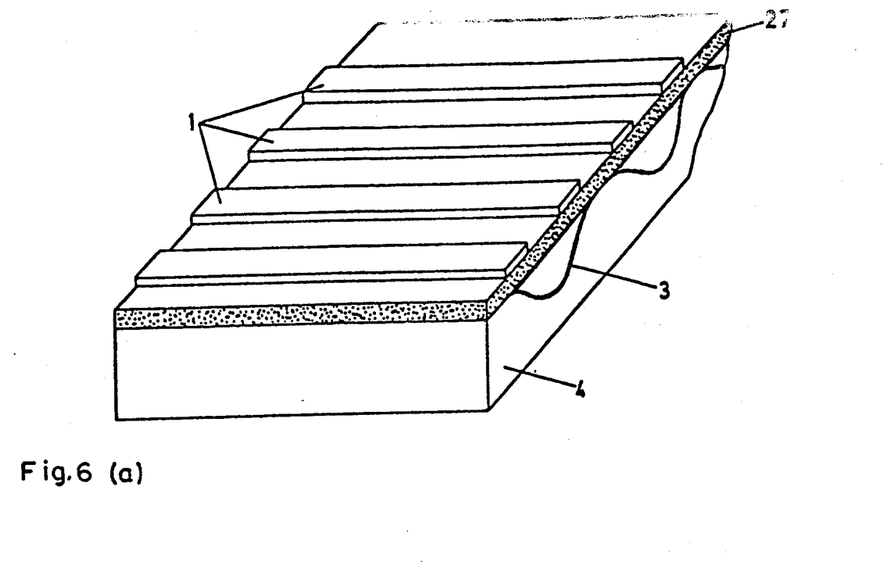

In a further embodiment, each of the optical modulators 20 is constructed as an electro-optical modulator (FIG. 6). In this case, the waveguide 3 itself is made of an electro-optically active material or covered by it as a cladding layer 27. By applying an electric field, the refractive index of this material can be changed by changing the optical conditions for the guiding of the light in the waveguide and thereby correspondingly modulating the transmitted light current.

Additonal embodiments may be implemented on the basis of other fiber optical light modulators that are known per se, such as microbending modulators, polarization state modulators, etc.

The integrated optical structure 13 is used for the distribution of the picture information:

As a result of the low scattering and absorption, the light that is coupled into the optical waveguide 3, in the normal state, is transmitted through the waveguides without interference and leaves them at the other end. A scattering into the space perpendicularly to the direction of the waveguides practically does not take place. Possible attenuation losses in each line, for achieving a uniform brightness, during the later-described coupling-out, may be compensated via the time sequence of the intensity of the respective light source.

Figure 7A:
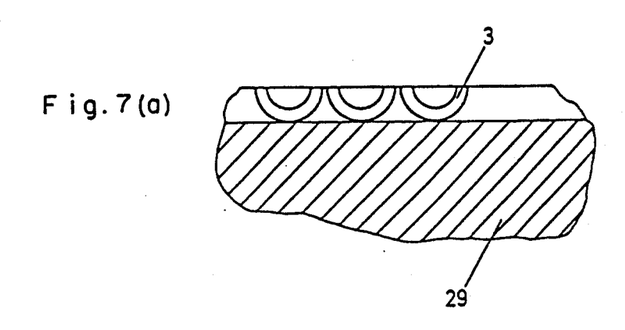
FIG. 7a is a first embodiment of the structure of an integrated-optical system for the distribution of the picture information.
Figure 7B:
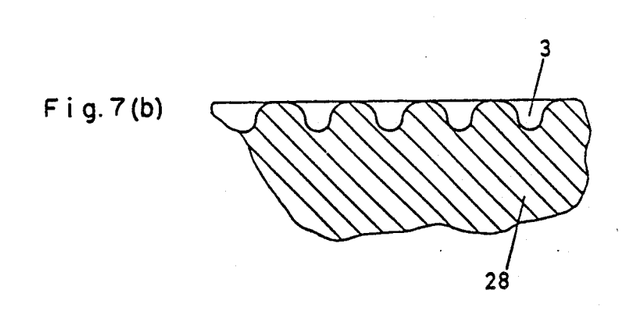
FIG. 7b is a second embodiment of this structure.

The integrated optical structure, that is represented by the N parallel waveguides 3, for the spatial distribution of the picture information, may be constructed in different embodiments (FIG. 7).

In a first embodiment, N optical waveguides 3, that are parallel with respect to one another, are integrated onto a transparent substrate 28 (see FIG. 7b). The substrate, in this case, may, for example, consist of a polished glass plate, on which, by means of a known photolitography process, silver ions are diffused into the glass surface in the desired waveguide geometry. After the conclusion of this diffusion process, the diffusion mask is removed. In this way, N embedded parallel single-mode and multi-mode waveguides 3 are obtained of an approximately crescent-shaped cross-section. The light that is fed into a waveguide of this type, in this case, experiences a total reflection at the waveguide/glass-substrate barrier layer as well as at the waveguide/air barrier layer in such a way that it can propagate along the waveguide with low losses. Integrated optical microstrips of the described form can be produced not only by the outlined diffusing-in method, but there are also other implementation possibilities, such as:

Pressing-in and filling-in of polymer matrix or mixed-oxide matrix

Selective etching and oxidizing of silicon;

photo-induced self-condensation, etc.

In a second, optically almost equivalent embodiment, N optical glass fibers 3 that are parallel with respect to one another, by means of a transparent polymer glue, are mounted on the surface of a surface-polished glass plate 29. In a subsequent work step, the glass plate, that was prepared in this way, is ground down fairly precisely to half the glass fiber thickness and is surface-polished. Again, an optical waveguide 3 with an approximately crescent-shaped cross-section is obtained within the core of each glass fiber.

The picture element coupling-out structure 14 is overlayed on the integrated optical light distribution structure 13. This picture element coupling-out structure typically consists of a number of M strip-shaped electrodes 1 that are mounted perpendicularly to the waveguides 3 and may also be structured further. These electrodes 1, together with the optical wave guides, form a type of lattice with $M \times N$ crossing points 5 which essentially represent the picture elements of the display. By means of a suitable control of the column electrodes 1, it is achieved that the prerequisite for a guiding of the light, that is almost without losses, in the respective waveguide is no longer met. Correspondingly, the light source is now beamed to the outside and is released into the half-space in front of the display for viewing purposes.

In order to obtain a light emission or coupling-out of light, light must be coupled into the corresponding line and the corresponding column must be activated at the same time. In the simplest implementation, it is sufficient to activate the columns, that are deactivated in the normal state, serially via a binary information. The actual picture information, i.e., the brightness and the grey levels, is obtained by means of the intensity of the modulated coupled-in light.

For the scanning of the display, one column respectively is then serially activated, and, at the same time, the light-emitting diodes, that correspond to a more or less bright picture element in this column, in the parallel operation, are excited by pulses corresponding to the desired brightness. Subsequently, the process is repeated for the respectively next column.

In another embodiment of the electro-optical componentry, a corresponding result may be achieved by means of a light transmission modulation.

The picture element coupling-out structure 14, that is controlled by means of the strip electrodes, may be implemented in different embodiments. First, a distinction should be made between two main embodiments:

a piezoelectrically driven micromechanical variant, and an electro-optical or thermo-optical variant.

In a first main embodiment (piezoelectrically driven micro-mechanical switch), the coupling-out structure is obtained by means of a modulation of the total reflection, that is a function of the control of the strip electrodes 1, at the surface of the optical waveguides 3. For this purpose, this barrier surface, for each optical waveguide simultaneously, is brought into optical contact with a column rod. This optical contact has the result that each optical waveguide, at a certain point in time, at the same picture column, beams the light to the outside that was guided to this location. A special scanning of the picture columns, from the first one to the last one, makes it possible to sequentially sweep over the whole length of the optical waveguides and thus over the whole surface of the video screen. The optical contacts, that are open as a rule, must therefore, sequentially and according to columns, be closed for a short time, and then be opened again. If 25 pictures are assumed per second and a total of $M = 400$ columns, a time period of 100 microseconds is obtained for, in each case, one optical contact-closing and contact-opening phase.

In the time period, during which the optical contact is closed, the light, that is guided in the waveguide, leaves this waveguide through the contact surface at a flat angle. It is therefore necessary to make this angle of emergence steeper by means of an additional optical component so that the light, that is guided out, will then be beamed approximately perpendicularly with respect to the plane formed by the optical waveguides.

The so-called column rods represent a special development of the strip electrodes 1. For this purpose, the strip electrodes are constructed in two parts (FIG. 8) and thus, for each column, therefore consist of two transparent electrodes 30 and 31 that are disposed above one another. Between these electrodes, a piezoelectric transparent layer 32 is arranged for each column. In addition, a transparent contact layer 33 may also be provided as an insulator layer. The thus modified strip electrodes are fixed on a transparent cover layer 34.

Figure 8:
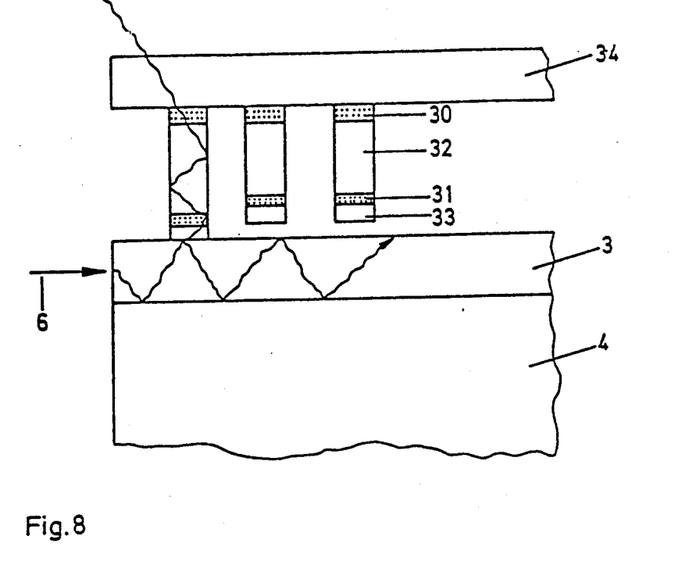
FIG. 8 is a schematic view of an arrangement having a piezo-electrically driven, micro-mechanical switch, the beaming taking place by means of column rods.

Since the thickness of the piezoelectric intermediate layers 32 is reduced by a fed voltage, in the live state, a gap will always exist between the controlled optical waveguides 3 and the insulator layer 33. By an interruption of the voltage, the air gap between the waveguides and the column rods is reduced to zero, so that now no longer the air, but the electrode material or a special insulating layer form the adjacent phase to the waveguide. The refractive-index change of the adjacent medium caused by the change of the adjacent phase leads to a local coupling-out of light.

Since each of the strip-shaped piezoelectric intermediate layers 32 has a larger refractive index than its environment, a lateral scattering of the light is practically impossible within these intermediate layers. The viewer therefore recognizes each crossing point and contact point between an optical waveguide and an insulator layer as a luminous picture element, the brightness of which is proportional to the light intensity that is fed into the corresponding waveguide.

Two embodiments may be taken into consideration in this case.

In a first embodiment (beaming by means of column rods; FIG. 8), the light is guided to the viewer in the same half-plane in which it emerges from the optical waveguides. This means that the light must perpendicularly pass through the piezoelectric column structure (column rods) that causes the optical activation and deactivation of the contact.

Figure 9:
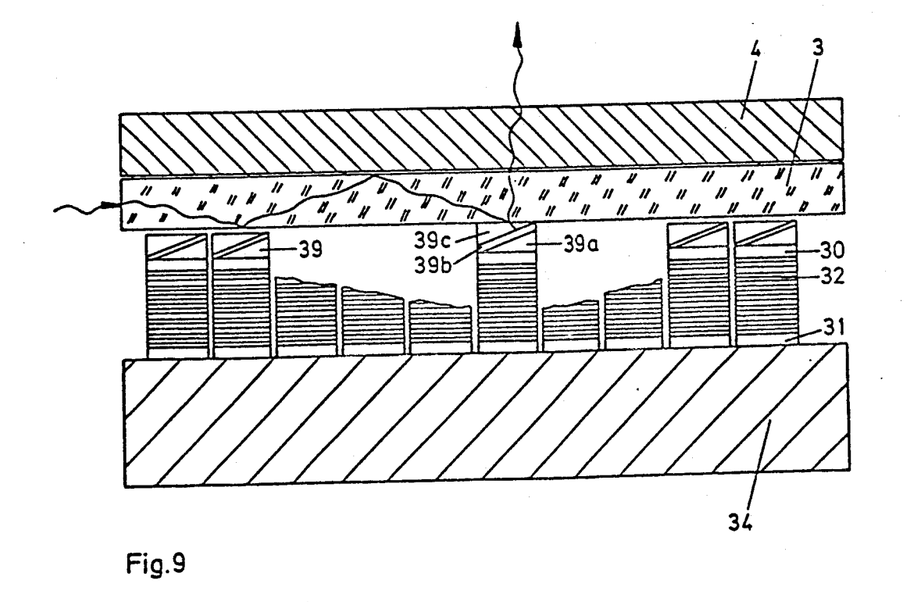
FIG. 9 is an arrangement that is similar to FIG. 8, the beaming taking place by means of a substrate.

In a second embodiment (beaming by means of a substrate; FIG. 9), the light that is guided out of the optical waveguides, is, by means of special mirror strips 39 arranged in column direction, reflected in such a way that passes through the optical waveguides approximately perpendicularly with respect to their optical axes and traverses the transparent substrate plate in order to then reach the viewer. In this embodiment, the light therefore leaves the whole active video screen in that half-plane that is opposed to the one in which it had first left the optical waveguides.

In this case, the mirror strips 35 consist of a first and a second prismatic element 39a and 39c, with the mirror layer 39b being disposed between them.

In a second main embodiment (electro-optical or thermo-optical coupling-out), the coupling-out of the light from the respective optical waveguide that is induced by a voltage signal at the column electrodes, is achieved by means of electro-optical or thermo-optical methods, which will be described in detail in the following and are schematically outlined in FIG. 10. These methods all have in common that the refractive index of a material component is changed either in a direct electro-optical way by the applied electric field, or indirectly by the temperature increase caused by means of the locally generated Joule effect. As a further alternative, the electrically induced rotation of the polarization direction of a coupling-out optical waveguide mode may also be utilized.

Figure 10A:
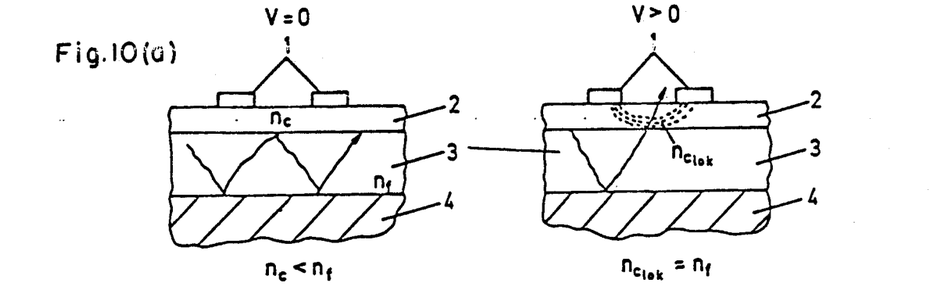
FIGS. 10a to 10e are schematic representations of different coupling-out methods, namely, in each case, on the left-hand side of these figures, in the not coupled-out state and, on the right-hand side, in the coupled-out state.

The direct electro-optical coupling-out is described schematically in FIG. 10a. In this case, the refractive index of the insulator layer 2 of the embodiment of the display shown in FIG. 1 is changed in such a way that a low-loss guiding of the light in the waveguide 3 is no longer possible. The change is achieved by means of the electric field which is created when a voltage is applied to two adjacent strip electrodes or strip electrodes that are arranged above and below the waveguide 1 or 1 and 36. At the point that is locally and temporarily modified by means of the refractive-index change, a coupling of the waveguide modes, that were guided to that point, therefore takes place to the continuum of the beaming modes in the external space. This means that locally there is a falling-below the prerequisite for the internal total reflection (see right-hand part of FIG. 10a). The preferred direction of the beaming of light is determined by the type of the modes and the achievable refractive-index difference. This difference, that is determined by the used materials, will be relatively small. Typical values of the difference between the refractive index $n_a$ of the insulator material and $n_f$ of the waveguide material are in the range of several $10^{-2}$ and $10^{-3}$. The main beaming thereforae takes place at a very flat angle relative to the surface.

An improvement of the beaming characteristic can be achieved either by a considerably scattering layer or by an optimized diffraction grating on the insulator material or by an insulator material having a suitable defractive-index gradient for the deflecting of the light.

The following substances, among others, may be used as materials for the production of the electro-optical insulator layer:

potassium niobate, lithium niobate;

lead oxide, lead zirconate titanate (PZT), lead lanthanum zirconate titanate (PLZT);

polydiacethylene, paranitroaniline, electro-optical dyes in polymer matrices;

stilbene in Langmuir-Blodgett films, etc.

Figure 10B:
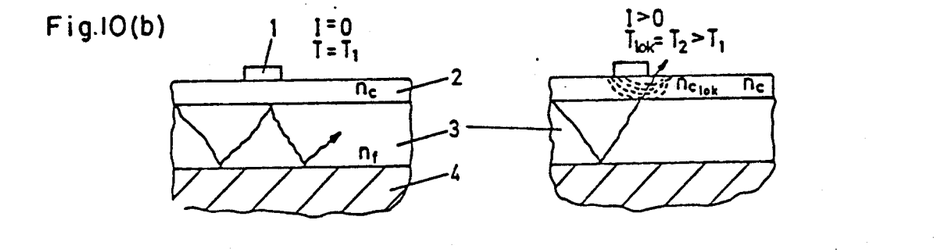

Instead of an electro-optical change of the refractive index of the insulator layer, this reflective index may also be affected by a local rise in temperature caused by means of the Joule effect generated by an electrical current (FIG. 10b). Otherwise, this process of the direct thermo-optically induced coupling-out corresponds to the above-discussed process.

Figure 10C:
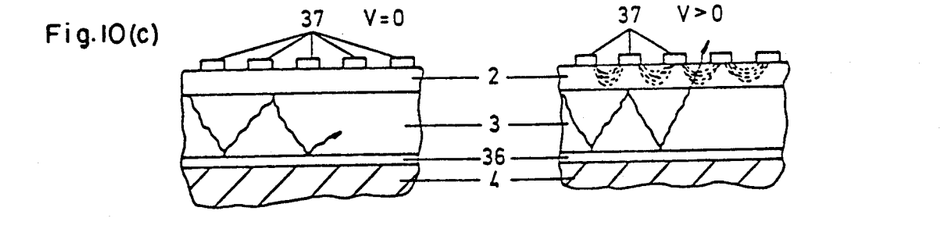

Coupling-out by means of an electro-optically induced refractive-index grid:

In the coupling-out method described by means of FIG. 10a, the beaming angle is determined essentially by the refractive-index difference in the insulator material that can be achieved locally in an electro-optical way. By means of the appropriate shaping of the counter-electrode 3, it is possible to achieve a periodic modulation of the refractive index and, as a result, produce a phase grid that is variable with respect to time. This, on the one hand, results in a more efficient coupling between the waveguide methods and a refracted wave, i.e., a wave that emerges from the display level toward the front; on the other hand, the appropriate selection of the grid parameters also results in the possibility of influencing the beaming angle, i.e., in particular, to achieve larger beaming angles (FIG. 10c). In order to achieve this type of a periodic modulation, each column electrode 1 is in each case shaped into a summit 37 of limited width. When the display dimensions are, for example, 5×5 cm², each of the columns may approximately be 100 um wide and thus comprise a number of periods. The counter-electrode 36, in this case, must be mounted between substrate 4 and waveguide layer 3.

Figure 10D:
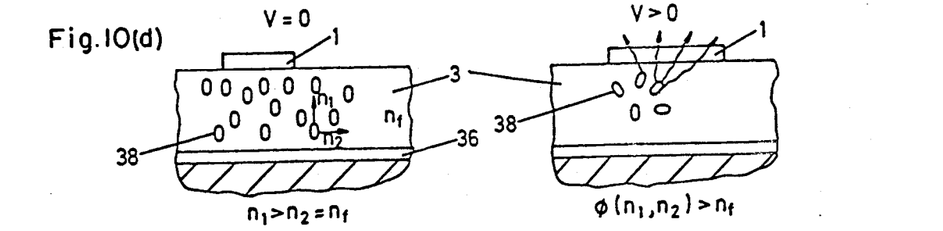

Coupling-out by means of induced scattering:

As an alternative to the above-described methods of coupling waveguide modes to beaming modes in the external space, light may also be deflected from the waveguide into the half-space in front of the display by means of induced scattering:

According to the embodiment in FIG. 10d, the waveguide 3 contains enclosed microdroplets 38 consisting of a nematically liquid-crystalline material. An applied electric field causes a turbulence in the liquid-crystalline phase 38 and, as a result, a scattering is induced of the light guided in the waveguide 3. This scattering is the result of the fact that the optical characteristics of the liquid-crystalline microdroplets are anisotropic, i.e., they have a different refractive index in difference directions. If this refractive index, in the case of uniformly aligned molecules, is just in the relevant direction adapted to the refractive index of the surrounding matrix material that forms the waveguide, the material seems homogeneous and a scattering does not occur. When the preferred orientation is lost or in the case of a targeted reorientation, however, the waveguide material becomes inhomogeneous and, as a result, considerably scatters the light that so far has been guided in the waveguide. The electrically caused local change of the orientation in the microdroplets therefore results in a beaming to the outside and thus in a bright element on the display.

Figure 10E:
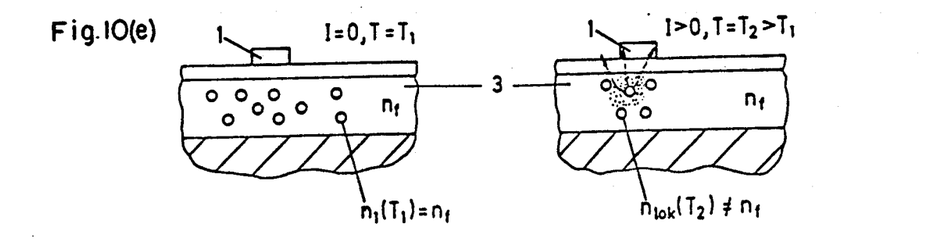

This type of scattering may also be achieved according to the method that is shown schematically in FIG. 10e, in which the waveguide is constructed according to the principle of Christiansen's filter. In this case, the waveguide also consists of two phases, the refractive indeces $n_1$ and $n_f$ of which coincide in the normal condition, thus at a temperature $T_1$ which, however, have a different temperature coefficient of the refractive index. By means of the local increase of the temperature, different refractive indeces are obtained for both phases, and thus a scattering of the light that had been guided to that point in the waveguide.

For a color control of the display according to the invention, basically two different alternatives are possible:

the integrated optical structure for the distribution of the picture information contains separate waveguides for each color, or the color control takes place in the time-division multiplex method by means of the sequential coupling of different colors into the same distribution structure.

Figure 11:
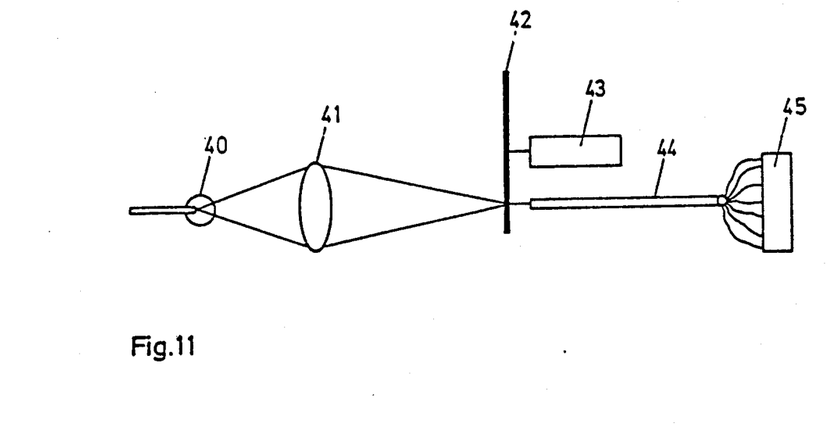
FIG. 11 is a representation for explaining the color control by means of the time division multiplex method via filters.
Figure 12:
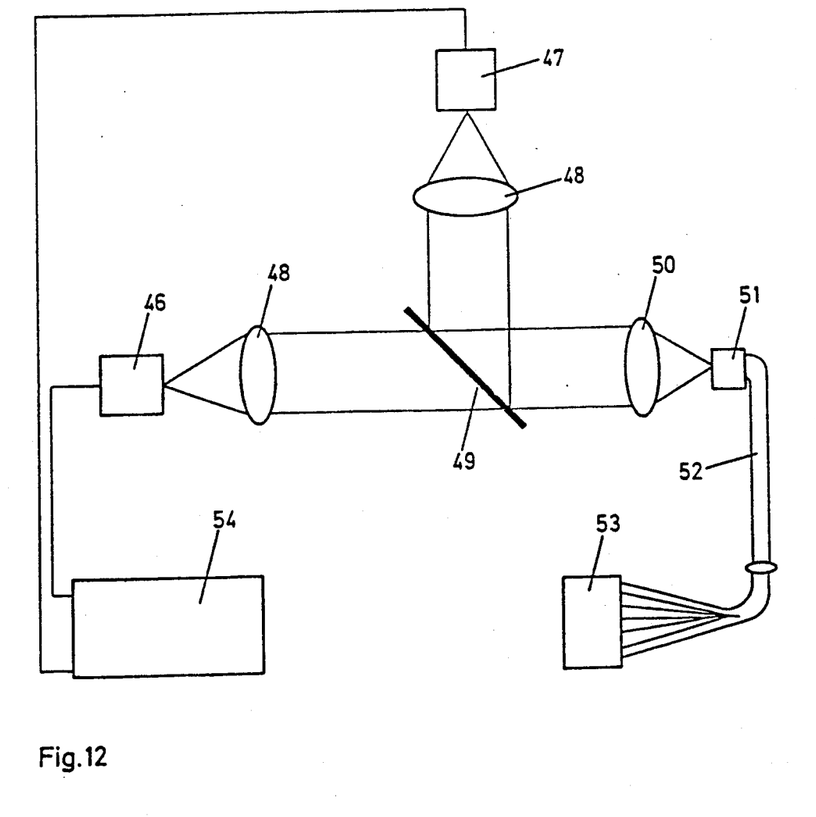
FIG. 12 is an embodiment of the color control by means of the time division multiplex method.

When the color is controlled in the time-division multiplex method, the use of a polychromatic light source with a sequentially changing color filter is possible (FIG. 11), or the use of several monochromatic light sources in combination with a dichroitic filter mirror (FIG. 12).

For this purpose, FIG. 11 shows a light source 40, the light of which is sent through a condenser 41. From there, the beamed light reaches a filter wheel 42 that can be set into rotation by means of a motor 43. At the circumference of the filter wheel, color filters, preferably in cyanic, yellow and magenta colors, are provided.

Behind the filter wheel, an optical waveguide 44 is arranged that transmits the filtered light to a light-distributing lens system 45.

In the embodiment according to FIG. 12, the color control takes place in the time-division multiplex method. For this purpose, a first light-emitting diode 46 is provided that shines, for example, in magenta. A second light-emitting diode 47 shines, for example, in yellow. The light of both light-emitting diodes is aligned in parallel by means of lenses 48 and impinges upon a dichroitic mirror 49. The light that passes through this semipermeable mirror or is reflected by it, via a collimator 50, is beamed to the input 5 of an optical waveguide 52 and leaves the optical waveguide and then enters a light-distributing lens system 53. Position 54 indicates a control for the two light-emitting diodes 46, 47.

The video screen according to the invention is therefore an active video screen in which the following essential functional elements can be distinguished:

generating of light and modulation of the picture content;

two-dimensional spatial light distribution; an coupling-out of light.

The generating of light takes place by means of known light sources which, in some embodiments, also permit a direct picture content (light/dark) modulation. In other embodiments, special modulators are used.

The spatial light distribution takes place by means of an integrated optical waveguide array or by means of an array of glass fibers. The spatially distributed coupling-out of light takes place by means of electro-optical, thermo-optical or opto-mechanical methods. For this purpose, the integrated optical light distribution structure is linked with a structure of parallel electric strip electrodes that extend perpendicularly with respect to the light distribution structure. The crossing points of these strip elelectrodes with the optical waveguides define the picture elements. The control of the strip electrodes (coupling-out) is synchronized with the picture contents modulation.

We claim:

1. An active flat-design video screen comprising:

signal line means, arranged in groups of lines and columns, which, at their crossing points, define picture elements of the video screen;

a control and signal processing means for controlling picture information supplied to the signal line means;

light element means for emitting modulated light, which is modulated corresponding to the picture information, wherein one of the groups of signal line means is formed by optical waveguides having an input side into which the modulated light signal is coupled;

coupling-out means at each of the crossing points, and responsive to said control and signal processing means, for coupling-out an optical signal in said optical waveguide, in a direction extending substantially perpendicular with respect to a plane of the video screen, and for coupling-out light from the optical waveguides in the area of each individual picture element as a function of said control and signal processing means of another group, other than said one group, of signal line means.

2. An active video screen according to claim 1 wherein said another group of signal line means are developed as strip electrodes in the area of the video screen.

3. An active video screen according to claim 1 characterized in that the optical waveguides are integrated in the form of microstrips in a substrate plate or are developed in the form of optical fibers which together are fastened on a substrate plate.

4. An active video screen according to claim 1 wherein said light element means comprises individually controllable light-emitting diodes or diode lasers for coupling light into said optical waveguides.

5. An active video screen according to claim 1 wherein said light element means comprises a single unmodulated light source with a light-distributing lens system connected behind said unmodulated light source, for coupling light into the individual waveguides, and, an individually controllable optical modulator in front of each coupling-in point of the light into the waveguides.

6. An active video screen according to claim 5, wherein the light source is constructed as a miniature $ZrO_2$ arc lamp or a miniature filament lamp, the light source is imaged on the front side of a light guide having a corresponding large core diameter, this light guide is coupled with a light guide bundle of approximately the same diameter and in that this bundle is fanned out into a linear array, each individual light guide being coupled to the individually controllable optical modulator.

7. An active vide screen according to claim 5 characterized in that the optical modulators are integrated in the form of an electrically controlled linear array onto a joint substrate plate.

8. An active video screen according to claim 5 wherein the optical modulators each include an input polarizer, a controlled electro-optical Kerr cell, and an output polarizer, in such a way that an electric control signal is converted into a light amplitude modulation.

9. An active video screen according to claim 8, wherein the Kerr cell includes an electro-optical ceramic component of the PLZT type or of an electro-optical polymer.

10. An active video screen according to claim 5 wherein the optical modulators are constructed as piezoelectrically, electrodynamically, electromagnetically or electrostatically adjustable diaphragm blades which reach into a separating gap of, in each case, one waveguide or of an optical fiber, in such a way that the respective light current is weakened corresponding to the blade position.

11. An active video screen according to claim 5 wherein the optical modulators are developed as optomechanical total-reflection modulators, in each case, an optical separating gap being provided that is arranged obliquely with respect to the beam direction, and the gap width of which, by means of a piezoelectric adjusting element can be changed between zero and a maximum of several light-wave lengths.

12. An active video screen according to claim 5 wherein the optical modulators are parallel, integrated optical microstrips, with an electro-optical insulator layer covering the optical microstrips, above and in parallel to the optical microstrips on the insulator layer, in each case, one electric pair of strip electrodes is arranged, in such a way that, when an electric field is applied to a pair of electrodes, the refractive index of the insulator layer is increased to such an extent that the refractive-index difference to the corresponding optical microstrip disposed below it is reduced and the angular range, within which the optical microstrip generates total reflection with respect to the insulator layer, is reduced correspondingly, whereby the light current transmitted by the optical microstrip is modulated correspondingly.

13. An active video screen according to claim 1 wherein said coupling-out means is constituted by the optical waveguides including at least two phases, the refractive indices of which, when the strip electrodes are not controlled, correspond to one another, and in that, by means of the voltage applied for the control of the strip electrodes, the refractive indices of both phases can be locally changed in different ways, so that they no longer correspond to one another, whereby a scattering of the light is caused that was previously guided in the waveguide.

14. An active video screen according to claim 13, characterized in that the optical waveguides (3) are constructed according to the principle of an electrically or thermally controllable Christiansen's filter in such a way that, when the refractive index of the two phases of the waveguide is identical, the light propagates in the waveguide and in that, when the refractive index is identical, light is scattered out of the waveguide in the direction of the viewer.

15. An active video screen according to claim 13, wherein the optical waveguides consist of a matrix with enclosed microdroplets of a liquid-crystalline material in such a way that, in the case of a certain alignment of the liquid crystals induced by the applied electric field, a scattering of the light in the waveguide is suppressed, whereas the droplets, in the random state, cause a scattering of the light in the direction of the viewer.

16. An active video screen according to claim 2 further comprising an insulator layer consisting essentially of an electro-optical polymer, from the group consisting of polydiacethylene or paranitroaniline or electro-optical dyes in polymer matrices or stilbene in Langmuir-Blodgett films;
said insulator layer disposed between said optical waveguides and said strip electrodes.

17. An active video screen according to claim 16 wherein said coupling-out means is constituted by said optical waveguides and said insulator layer of which refractive indices are different when said strip electrodes are not controlled and correspond to one another when the voltage is applied to said strip electrodes whereby light is coupled out of said optical waveguides.

18. An active video screen according to claim 1, wherein a color control is made possible by developing the waveguides as pairs disposed next to one another in parallel or as triplets of optical waveguides in such a way that into each waveguide of this type of a group only light is coupled of a light-emitting diode of a suitable color (red, yellow, green or blue).

19. An active video screen according to claim 1, wherein a color control in the time-division multiplex method is made possible by using a polychromatic light source and a sequentially changing color filter in such a way that, by means of a light-distributing lens system, a color triplet (red, yellow, blue) is coupled successively into the same waveguide.

20. An active video screen according to claim 1, wherein a color control in the time-division multiplex method is made possible by using two or three monochromatic light sources in such a way that light from these light sources successively, via a dichroic filter mirror, is directed to one and the same focussing site and then, via the light-distributing lens system, is coupled into the waveguides.

* * * * *